Sept. 26, 1961 R. T. PEASLEE 3,001,286
APPARATUS FOR TRIMMING GRASS ADJACENT TO WATER SPRINKLER HEADS
Filed Aug. 18, 1960

INVENTOR.
RICHARD T. PEASLEE

United States Patent Office 3,001,286
Patented Sept. 26, 1961

3,001,286
APPARATUS FOR TRIMMING GRASS ADJACENT TO WATER SPRINKLER HEADS
Richard T. Peaslee, 1210 Polk St., Salinas, Calif.
Filed Aug. 18, 1960, Ser. No. 50,524
1 Claim. (Cl. 30—207)

The present invention consists of a device for trimming grass immediately around and adjacent to water sprinkler heads of the embedded, permanently-installed type so that a single positioning, downwardly inserting, and reversibly rotating (back and forth) operation of the apparatus will complete the grass-trimming operation around any given water sprinkler head very rapidly and easily and in a manner vastly superior to hand trimming with scissors, shears, or other auxiliary cutting tools as has been the conventional prior art practice.

It is an object of the present invention to provide apparatus of the character referred to above which is of extremely simple, cheap, foolproof construction such as to be conducive to widespread use thereof.

Further objects are implicit in the detailed description which follows hereinafter and will be apparent to persons skilled in the art after a careful study thereof.

For the purpose of clarifying the nature of the present invention, two exemplary embodiments are illustrated in the hereinbelow-described figures of the accompanying single drawing sheet and are described in detail hereinafter.

Figure 1:
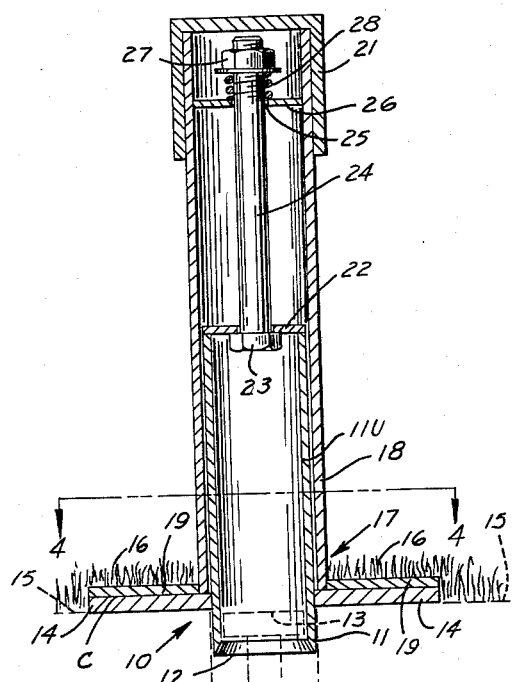
FIG. 1 is a longitudinal, vertical sectional view showing the central, cylindrical, tubular, locating portion of the stator unit in downwardly inserted relationship into a ground surface immediately around an embedded water sprinkler head. This view shows the rotor unit positioned in approximately the proper plane for grass-shearing operation thereof.
Figure 2:
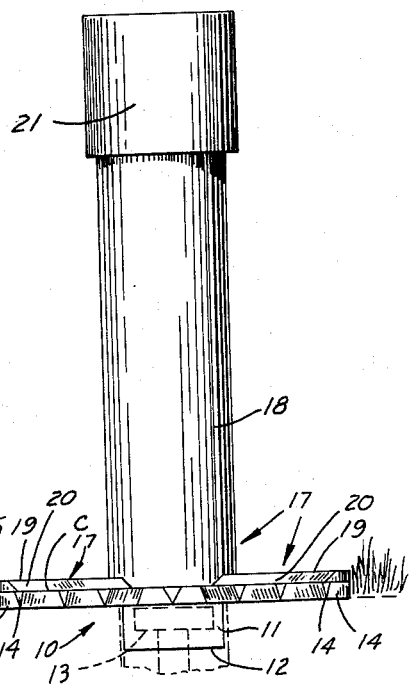
FIG. 2 is an elevational view of the apparatus of FIG. 1 after grass-shearing operation thereof.
Figure 3:
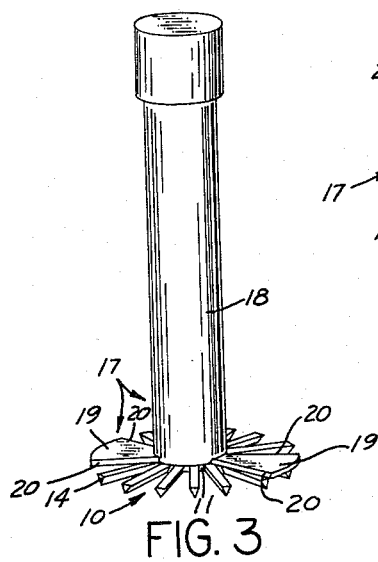
FIG. 3 is a reduced-size oblique view of the invention shown alone and without any grass or water sprinkler head in operative relationship with respect thereto in the manner of FIGS. 1 and 2.

Referring to FIGS. 1–5 for exemplary purposes, one illustrative embodiment of the invention takes a typical exemplary form wherein it comprises a stator unit, indicated generally at 10, which consists of a centrally positioned cylindrical pipe 11 having an edge 12 which is adapted to be forced downwardly immediately around an embedded water sprinkler head, such as that indicated at 13, into the position shown in FIGS. 1 and 2 whereby to cut away grass immediately around the sides of the water sprinkler head 13 and whereby to firmly center and position the entire apparatus for subsequent grass-trimming operation thereof.

The stator unit 10 also includes a plurality of fixed and normally non-rotary circumferentially spaced radially outwardly directed blades 14 each centrally connected to the exterior of the central hollow tubular pipe portion 11 of the stator unit 10 at a position vertically spaced above the cutting edge 12 of the central pipe 11 such that the plurality of blades 14 will lie on a ground surface, such as is indicated at 15, when the edge 12 of the central tubular pipe portion 11 is downwardly inserted around the embedded water sprinkler head 13 in the manner shown in FIGS. 1 and 2. The blades 14 have a thickness in a vertical direction corresponding to a desired vertical spacing of a horizontal grass-cutting plane, indicated at "C," above the ground level 15.

Figures 4, 6:
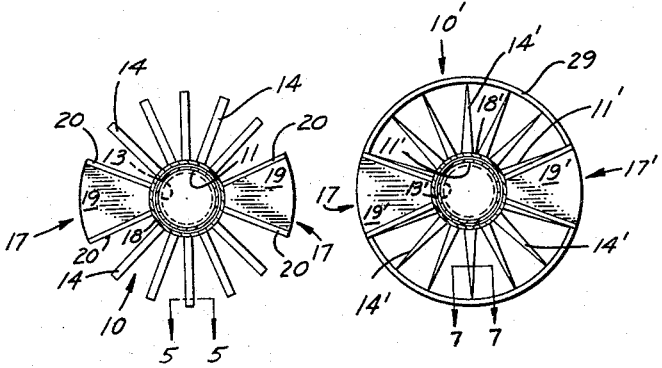
FIG. 4 is a view taken in the direction of the arrows 4—4 of FIG. 1 and thus is partly a top plan view and partly a cross-sectional view. However, in this view the grass and the ground surface are removed for drawing simplification reasons.
FIG. 6 is a view similar to FIG. 4 but illustrates a slightly modified form of the rotary unit.
Figures 5, 7:
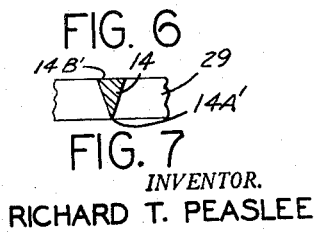
FIG. 5 is an enlarged sectional view taken in the direction of the arrows 5—5 of FIG. 4.
FIG. 7 is an enlarged fragmentary sectional view taken in the direction of the arrows 7—7 of FIG. 6.

It should be noted that in one preferred form of the invention as illustrated in FIGS. 1–4, each of the outwardly directed blades 14 is of substantially inverted triangular shape in cross-section, as best shown in FIG. 5, having a bottom apex portion 14A and a flat base portion 14B at the top thereof effectively comprising a substantially horizontal cutting edge portion lying in a common horizontal cutting plane with all of the other similar cutting edge portions 14B of all of the other blades 14 of the stator unit 10. This arrangement of the blades 14 provides for maximum grass-cutting efficiency in operation for shearing the grass 16 immediately above a top surface of each of the substantially horizontal cutting edges 14B in the common horizontal cutting plane indicated at "C" in FIGS. 1 and 2.

The present invention also includes a rotor unit, such as is indicated generally at 17, which, in the example illustrated, consists of an outer cylindrical tubular pipe portion 18 positioned around an upper part 11U of the central tubular pipe portion 11 of the stator unit 10 for relative rotation with respect thereto, with the lower end of the tubular pipe portion 18 being provided with outwardly directed blade means terminating at the bottom thereof in a substantially horizontal cutting edge portions lying in the common horizontal cutting plane "C" referred to hereinbefore immediately above and in grass-shearing relationship with respect to the corresponding top cutting edges 14B of the blades 14 of the stator unit 10. In the specific example illustrated in FIGS. 1–5, the blades of the rotor unit are two in number and are indicated by the reference numeral 19. In the example illustrated, each of the rotor blades 19 is of substantially sector-shaped form having radial bevelled cutting edges 20 at each edge thereof adapted to move in the common horizontal cutting plane "C" and to lie immediately above the cutting edges 14B of the blades 14 of the stator unit 10, whereby rotation of the tubular outer sleeve 18 of the rotor unit 17 with respect to the inner tubular sleeve 11U of the stator unit 10 will effectively shear the grass 16 in the common horizontal cutting or shearing plane "C" to a uniform level. Since each of the rotor cutting blades 19 has a bevelled cutting edge 20 at each edge thereof, the rotary movement thereof can be of an oscillating type rather than continuously rotary type. This produces a very effective grass-shearing operation by several oppositely directed twisting movements manually applied to a manually graspable cap member 21, which is preferably made of rubber or other suitable elastomeric material (although not specifically so limited), frictionally fitted over the open top of the outer tubular sleeve 18 of the rotor unit 17.

The cap 21 effectively comprises manually actuatable handle means for rotating the rotor unit 17 with respect to the stator unit 10 for shearing the grass 16 extending through the common horizontal shearing or cutting plane "C" and lying around the embedded water sprinkler head 13.

In the specific example illustrated, the inner tubular portion 11U of the stator unit 10 has an upper end 22 which carries a bolt head 23 of a bolt 24 which extends through an opening 25 in a wall member 26 carried below the open top end of the outer tubular member 18 of the rotor 17, with a nut 27 being adjustably threaded onto the end of the bolt 24 above said wall 26 and being effectively interconnected with respect thereto by biasing spring means 28.

The specific structure just described comprises one means for adjustably rotatably mounting the rotor unit 17 immediately above and in concentric rotatable relationship with respect to the stator unit 10 and for doing so in a manner whereby the spring means effectively biases the stator unit and the rotor unit toward each other to a degree determined by the threaded adjustment of the bolt 24 with respect to the nut 27 whereby to adjust the force at the cutting interface between the blades 19 of the rotor unit 17 and the blades 14 of the stator unit 10 for maximum grass-cutting efficiency.

Incidentally, it should be noted that the bottom portion of the tubular cylindrical pipe 11 effectively comprises means for manually placing the superimposed and concentrically rotatably mounted rotor and stator units 17 and 10 immediately around a fixed water sprinkler head, such as that shown at 13, in a position for horizontal planar shearing action in the plane indicated by the reference numeral "C" with respect to surrounding grass such as that indicated at 16.

The removable rubber cap 21 makes it possible to disassemble the device for cleaning and sharpening the blades, as required, by removing the cap 21 and then removing the threaded nut 27 and bolt 24 which allows the inner and outer sleeves 11U and 18 to be separated whereby to completely separate the rotor and stator units 17 and 10. After cleaning and/or sharpening, the rotor and stator units can be just as quickly and easily reassembled by the reverse of the sequence of operations described above.

FIGS. 6 and 7 illustrate a slight modification of the outwardly directed blades of the stator unit which, in this modification, are designated by the reference numeral 14'. In this modification, each of the blades 14' progressively diminishes in width along the flat top cutting edge 14B' as it extends from the central connection to the tubular portion 11' to the outer tip thereof there it is provided with an auxiliary structural supporting ring 29 adapted to prevent bending or breakage of any of the blades 14'. This auxiliary supporting ring 29 may also be tapered toward the bottom edge if desired in the manner of each of the radial blades 14' so as to terminate in an apex similar to that shown for each of the radial blades at 14A'.

The device is preferably made of light-weight materials, perhaps aluminum or magnesium for the tubular parts and steel for the cutting blades, although the invention is not specifically so limited.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

A grass trimmer for water sprinkler heads of the permanently-installed type, comprising: a stator unit consisting of a plurality of fixed non-rotary circumferentially-spaced radially outwardly directed blades, each terminating in a substantially horizontal cutting edge portion lying in a common horizontal cutting plane; a rotor unit consisting of a plurality of manually rotatable circumferentially-spaced radially outwardly directed blades, each terminating in a substantially horizontal cutting edge portion lying in the common horizontal cutting plane immediately above and in shearing relationship with respect to the corresponding top cutting edge portions of the blades of the stator unit; means for rotatably mounting the rotor unit immediately above and in concentric rotatable relationship with respect to the stator unit, said means for rotatably mounting the rotor unit with respect to the stator unit comprising an upwardly directed inner tubular member concentrically carried by the stator unit and provided with a hollow cylindrical portion at the bottom thereof adapted to encompass and surround a fixed water sprinkler head, and further comprising an outer upwardly directed tubular member carried by the rotor unit and rotatably exteriorly concentrically mounted on the upwardly directed inner member carried by the stator unit; adjustable biasing spring means effectively acting between the outer tubular member connected to the rotor unit and the inner tubular member connected to the stator unit and controllably adjustably biasing them toward each other in a manner tending to force the rotor blades against the stator blades; and actuating means for manually placing the superimposed and concentrically rotatably mounted rotor and stator units immediately around the fixed water sprinkler head and in a position for horizontal planar shearing action with respect to surrounding grass, said actuating means including manually actuatable means for rotating the rotor unit with respect to the stator unit for shearing grass extending through the common horizontal cutting plane and lying around the fixed water sprinkler head.

References Cited in the file of this patent

UNITED STATES PATENTS

| | | |
|---|---|---|
| 2,939,212 | Bolger | June 7, 1960 |
| 2,953,852 | Dehn | Sept. 27, 1960 |